United States Patent
Madany

(10) Patent No.: US 6,938,134 B2
(45) Date of Patent: Aug. 30, 2005

(54) SYSTEM FOR STORING BLOCK ALLOCATION INFORMATION ON MULTIPLE SNAPSHOTS

(75) Inventor: Peter W. Madany, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 481 days.

(21) Appl. No.: 10/251,601

(22) Filed: Sep. 19, 2002

(65) Prior Publication Data
US 2004/0059878 A1 Mar. 25, 2004

(51) Int. Cl.⁷ .............................................. G06F 12/00
(52) U.S. Cl. ......................... 711/161; 711/162; 707/204
(58) Field of Search ............................... 711/161, 162; 707/204

(56) References Cited

U.S. PATENT DOCUMENTS

| | | | | |
|---|---|---|---|---|
| 5,734,861 A | * | 3/1998 | Cohn et al. | 711/134 |
| 5,819,292 A | * | 10/1998 | Hitz et al. | 707/203 |
| 5,860,103 A | * | 1/1999 | Franaszek et al. | 711/133 |
| 5,953,729 A | * | 9/1999 | Cabrera et al. | 707/204 |
| 6,223,269 B1 | * | 4/2001 | Blumenau | 711/202 |
| 6,453,403 B1 | | 9/2002 | Czajkowski | |
| 6,484,186 B1 | * | 11/2002 | Rungta | 707/203 |
| 6,732,125 B1 | * | 5/2004 | Autrey et al. | 707/204 |
| 6,766,409 B2 | * | 7/2004 | Komatsu et al. | 711/103 |
| 6,842,825 B2 | * | 1/2005 | Geiner et al. | 711/133 |
| 2004/0250033 A1 | * | 12/2004 | Prahlad et al. | 711/162 |

* cited by examiner

*Primary Examiner*—Matthew D. Anderson
*Assistant Examiner*—Hetul Patel
(74) *Attorney, Agent, or Firm*—Meyertons Hood Kivlin Kowert & Goetzel, P.C.; B. Noël Kivlin; Rory D. Rankin

(57) ABSTRACT

An apparatus and method for locating free data blocks in a microprocessor-based system for which snapshots are maintained. The snapshots are stored periodically, but only a subset of live snapshots is retained in order to reduce the total amount of storage needed for the snapshot information, such that their snapshot numbers are not sequential and there are gaps in the snapshot times. For each data block to be accessed, an allocation time and a deallocation time are stored in an allocation table. When a data block is needed, its allocation and deallocation times are compared with the live snapshot times to determine whether that data block is available. If not, the system iterates through the other data block allocation information until a free data block is located. If so, the system writes to that data block, and repeats the procedure as necessary to locate additional free data blocks.

21 Claims, 5 Drawing Sheets

| Block No.: | Allocated In Snapshot Number: | Freed In Snapshot Number: | |
|---|---|---|---|
| 0 | 12 | 165 | 35 |
| 1 | 15 | 42 | |
| 2 | 54 | 212 | |
| 3 | 127 | 141 | |
| 4 | 156 | 414 | |
| 5 | 257 | 0 | |
| 6 | 0 | 0 | |
| n-1 | AllocatedIn | FreedIn | |

100

- Boot Block — 110
- Superblock — 120
- Allocation Table — 35
- Inode Table — 130
- Root Directory — 140
- Other files and directories — 150

SYSTEM FOR STORING BLOCK ALLOCATION INFORMATION ON MULTIPLE SNAPSHOTS

BACKGROUND OF THE INVENTION

The present invention relates to a computer system configured to store block allocation information relating to snapshot data on the system. At least some systems currently in use that provide snapshots, i.e. data from which the state of the system at a given time can be recovered, are designed to store information relating to each snapshot taken of the system, cross-referenced to each data block in the system The number of data blocks stored in the system may be many millions or billions (or more), and as a result the overhead associated with the block allocation snapshot data can be quite large. For instance, in the "WAFL" (write-anywhere file layout) system of Network Appliance, Inc., snapshots are associated in a manner correlated with each data block, such that a very large array of information is built and stored to preserve the past states of the system. See U.S. Pat. No. 5,819,292 to Hitz et al., entitled *Method for Maintaining Consistent States of a File System and for Creating User-Accessible Read-Only Copies of a File System.*

A system is accordingly needed that can reduce the amount of data needed to provide snapshot information about the blocks of data stored in a system, along with a mechanism that provides an efficient way of determining whether a given block of data is needed to preserve the history of snapshots for the system, or alternatively is a free block to which data may be written.

SUMMARY OF THE INVENTION

A system according to the invention is configured to store a series of snapshots reflecting state information for the system at predetermined intervals, and to retain only a subset of those snapshots and eventually releasing other snapshots, the retained snapshots being referred to as "live" snapshots. The system also stores an allocation table including entries for each data block accessed by the system, with an allocation time and a deallocation time for each data block being stored in the allocation table.

When the system generates a write command (or a write request comes from an application), it must be determined which data blocks are free to be written to. The system (e.g. under the control of an application or logic configured for the purpose) compares allocation and deallocation information for a first data block with the snapshot times for the set of live snapshots, until it is determined either that the data block is unavailable for writing, i.e. its allocation and deallocation times encompass a time for one of the live snapshots, or that the data block is available for writing.

If the data block is available for writing, it is so identified to the system, and that data block is written to. If the data block is unavailable for writing (either because it has been allocated but not deallocated or because its allocation and deallocation times encompass a live snapshot time), or if further data blocks are needed for writing, the process is repeated to locate additional available blocks.

DETAILED DESCRIPTION OF THE INVENTION

Figure 1:
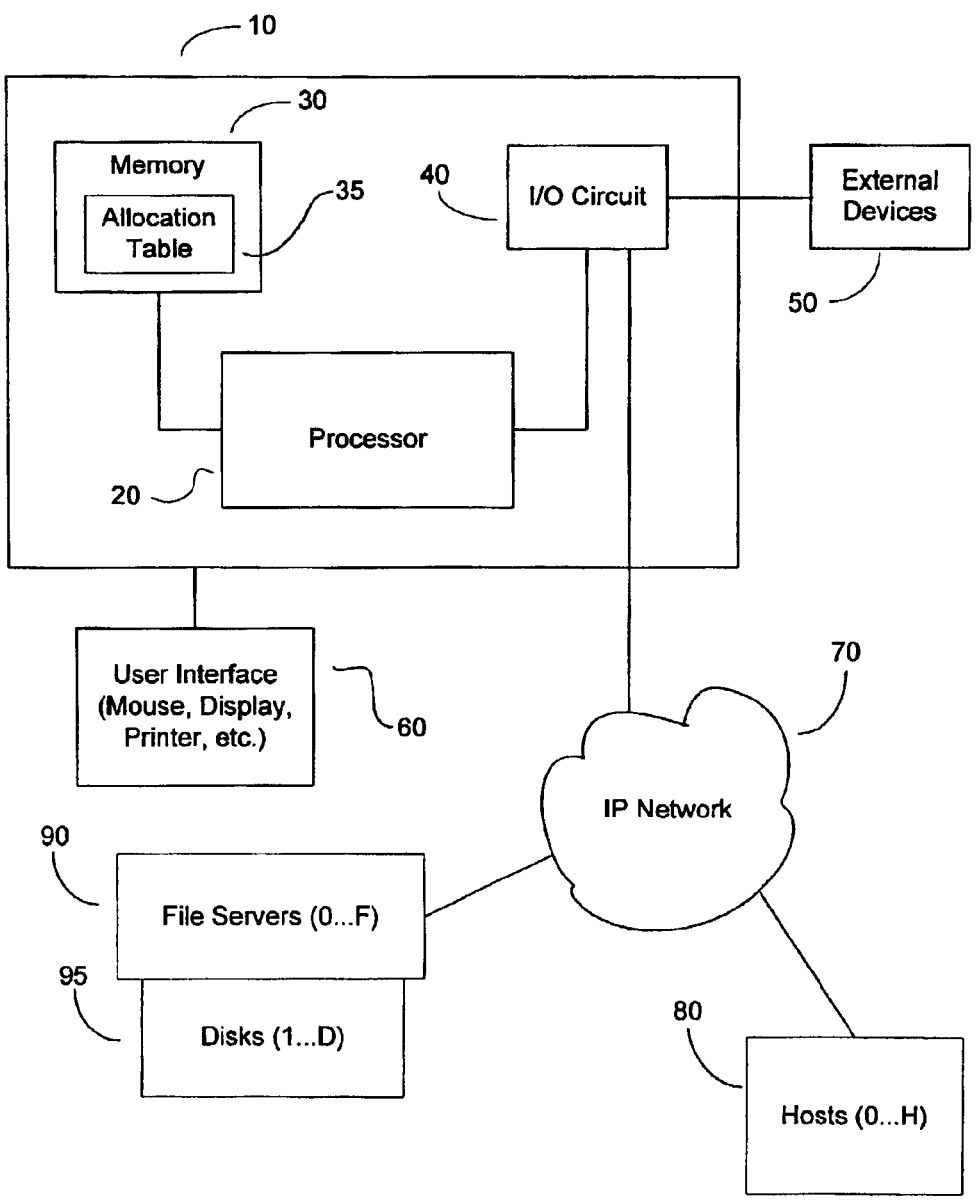
FIG. 1 is a diagram of a processor-based system incorporating an embodiment of the present invention, in communication with a network.

A processor-based system 10 implementing an embodiment of the invention is shown in the block diagram of FIG. 1. The system 10 may be a server, a workstation, a personal computer, or any other host or system that executes or controls data storage operations. More generally, the system 10 may represent or be connected to a network of processor-based systems. In any of these cases, the system 10 may have multiple users who work either separately or collaboratively on a set of files stored and accessed by the system.

The system 10 includes a microprocessor module 20, which includes at least one microprocessor operating in a conventional fashion and communicating with memory 30 and I/O (input-output) circuitry and/or logic 40. The memory 30 may in part store control software configured to execute operations according to the invention, and among other things stores an allocation table 35 according to the invention, described below. Alternatively, the allocation table 35 may be stored in another storage medium or unit, or some combination thereof A user interface 60 coupled to the system 10 includes a mouse, display, printer, track ball, and/or other devices allowing a user to interact with the system 10.

The I/O circuitry may include conventional circuitry and/or logic to communicate with external devices 50 which may include storage devices, other workstations or servers, or any of a number of devices that can communicate over a network to the system 10 and exchange data with it. The connection to the external devices may be by any conventional network, fibre channel, wireless or other communication mechanism.

Specifically, the system 10 may be in communication with a network such as an Internet Protocol (IP) network 70 which is also in communication with other hosts 80 (0 . . . H indicating between 0 and some number H additional hosts), as well as with file servers (0 . . . F) 90, each of which will in general have attached disks (1 . . . D) 95. Thus, a suitable setting for a system of the invention is a network of workstations or servers with file servers on the network controlling disk storage for the multiple hosts.

As users of the system 10 make changes to files and store those changes, it becomes useful to store snapshots of the states of the system over time, in case of a failure, accidental deletion of files, or other reason to recover a given state of the system.

In the present description, the term "snapshots" may be taken to refer generally to a desired subset of (or, alternatively, substantially complete) state information about the system's memory and/or stored files, directories, modes and data blocks, including time stamps for any or all of these. In particular, the snapshots may be as described in the above-mentioned U.S. Pat. No. 5,819,292, which is incorporated herein by reference, with differences relating to the subject matter of the present invention as described herein. In conventional systems, the data blocks may, as an example, include thirty-two 512-byte sectors. These blocks are allocated to a given file, and if they are no longer needed—e.g., the file is deleted or the data stored in a given block has been changed and the new data is stored in a different block—then blocks may be freed up again, and become available for storage of new data.

Snapshots may be taken of all the blocks stored by the system, which according to the present invention will include information about the time or snapshot number in which a block was allocated, and the time or snapshot number in which the block was freed. Thus, in one embodiment of the present system, the allocation table 35 may be configured as in FIG. 2, with an allocated-in snapshot number (or other time designation) and a freed-in snapshot number (or other time designation) associated with each block number 0 to n−1, where n is the total number of blocks used by the system.

The allocation table is updated with new information as necessary as blocks are allocated and deallocated. When a block is allocated, the time, number or other designation of the corresponding snapshot is stored in the AllocatedIn field for that block in the allocation table 35 of FIG. 2, and the FreedIn field is set to "0" (or another null indicator). Similarly, when a block is deallocated, the time, number or other designation of the snapshot corresponding to the deallocation time is stored in the FreedIn field for that block in the allocation table.

Since n may be very large (e.g. in the millions), depending upon the system it may not be practical to store a large number of snapshots, since each snapshot involves storing a large amount of state information. Thus, snapshots may be stored on a periodic basis, such as every hour (or every few hours) during the day, with a daily snapshot at the end of the day, with this pattern repeated daily and then including a weekly snapshot, and so on. In order to reduce the total amount of state data stored, a maximum number of stored snapshots may be specified, and certain intervening snapshots may be dropped. For instance, the daily and weekly snapshots for a given month may be retained, along with the hourly (or other period) snapshots only for the most recent day, and a current monthly snapshot. Other variations are possible, the common factor being that a lower density of snapshot storage is retained than is originally made.

With this arrangement, there will be snapshot numbers that are current, i.e. "live", and others that have been disposed of to save storage space. If, for instance, the snapshots are numbered sequentially from snapshot 1, then at first snapshots 1, 2, 3, etc. will be stored, but as discussed above, certain snapshots will be dropped, so perhaps only snapshots 6, 12, 18, etc. are retained, along with the most recent hourly, daily and monthly snapshots. Accordingly, the series of live snapshot numbers will not be sequential, as would be the case if every snapshot were retained.

When data is to be written to a data block, it must first be determined that the block is available, which in the case of the present invention includes a determination that a given block is not in a live snapshot. If there is any live snapshot being retained by the system whose time is between the allocated-in time and the freed-in time for a given block, then that block is not considered to be available for writing, since it would then not be possible to recover the state of the system at the time of that snapshot.

Accordingly, to write new data to data blocks, in order to preserve the information for live snapshots, in the present invention it is determined whether, for each block under consideration for writing (e.g. blocks 0 . . . n−1 in FIG. 2), a live snapshot number (or other designation equivalently referring to a live snapshot) falls between the allocated-in snapshot number and the freed-in snapshot number. This will be described below in connection with FIGS. 4–6.

Figures 2, 3:
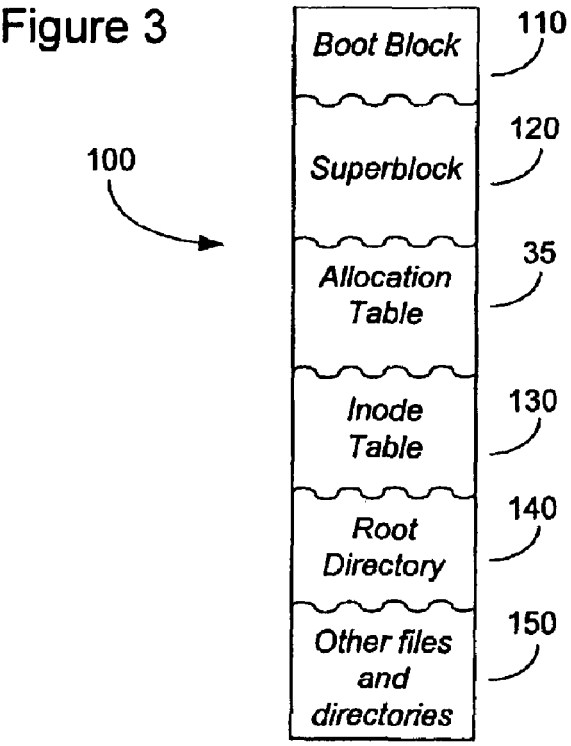
FIG. 2 illustrates an allocation table of one embodiment of the invention.
FIG. 3 illustrates a logical disk layout of blocks, files and directories according to one embodiment of the invention.

FIG. 3 shows a suitable disk configuration 100 for storing information supporting the present invention. The disk configuration includes a boot block 110, a superblock 120, an allocation table 35, an inode table 130, a root directory 140, and other files and directories 150. All of these elements except for the allocation table 35 may be conventional elements as used in current systems. The root directory may in one embodiment be stored along with the files and directories 150.

The blocks may be of any suitable size, including more or fewer than the 32 512-byte sectors mentioned above, and the sectors themselves may be larger or smaller.

Three basic operations or procedures that are used in an embodiment of the invention are: (1) find a free block; (2) allocate that block; and (3) when the block is no longer needed, deallocate (free) the block. Operations 2 and 3 are reflected in FIG. 2. For instance, block 0 in FIG. 2 is shown as having been allocated in snapshot 12 and deallocated in snapshot 165; block 1 was allocated in snapshot 15 and deallocated in snapshot 42; and so on.

Block 5 is shown as having been allocated in snapshot 257, and the "0" or null entry in the freed-in column for block 5 indicates that it has not been deallocated. Block 6 has a null entry for the allocation time, and thus has not been allocated. Block n−1 (in this example) has unspecified AllocatedIn and FreedIn values for the allocation and deallocation times. (The AllocatedIn and FreedIn variables would have actual values or null entries in an implementation of the table; these variable names correspond to Procedures 1 and 2, discussed below.)

The word sizes for the AllocatedIn and FreedIn entries in FIG. 2 may be made large enough so that the maximum number of possible snapshots to be used may be accommodated without wrapping. For instance, if 16-bit words are used, this would accommodate $2^{16}$ (about 64,000) snapshots. If the snapshots are taken at 4-hour intervals, this would allow about 4×64,000=256,000 hours (a little more than 1000 days) of snapshots to be taken before wrapping or recycling the 16-bit words for additional snapshots. Since the typical life of a hard drive today is generally on about this order of magnitude, it would be helpful for this purpose to select a larger word for the AllocatedIn and FreedIn entries. A 24-bit word would increase potential snapshot period by a factor of $2^8$=256, i.e. about 256 times the expected life of the hard disk, and thus would in most cases be big enough for a long snapshot period without wrapping the snapshot numbers back to 0 and beginning to use them over.

Using a smaller word (e.g. 8 or 16 bits) for the allocated-in and freed-in entries in FIG. 2 would, of course, save disk space for storage of the table 35, with the trade-off being that suitable logic or software would be needed to implement a wrap-around mechanism as the number of snapshots reaches the maximum number allowed by the words of the selected size.

Figure 4:
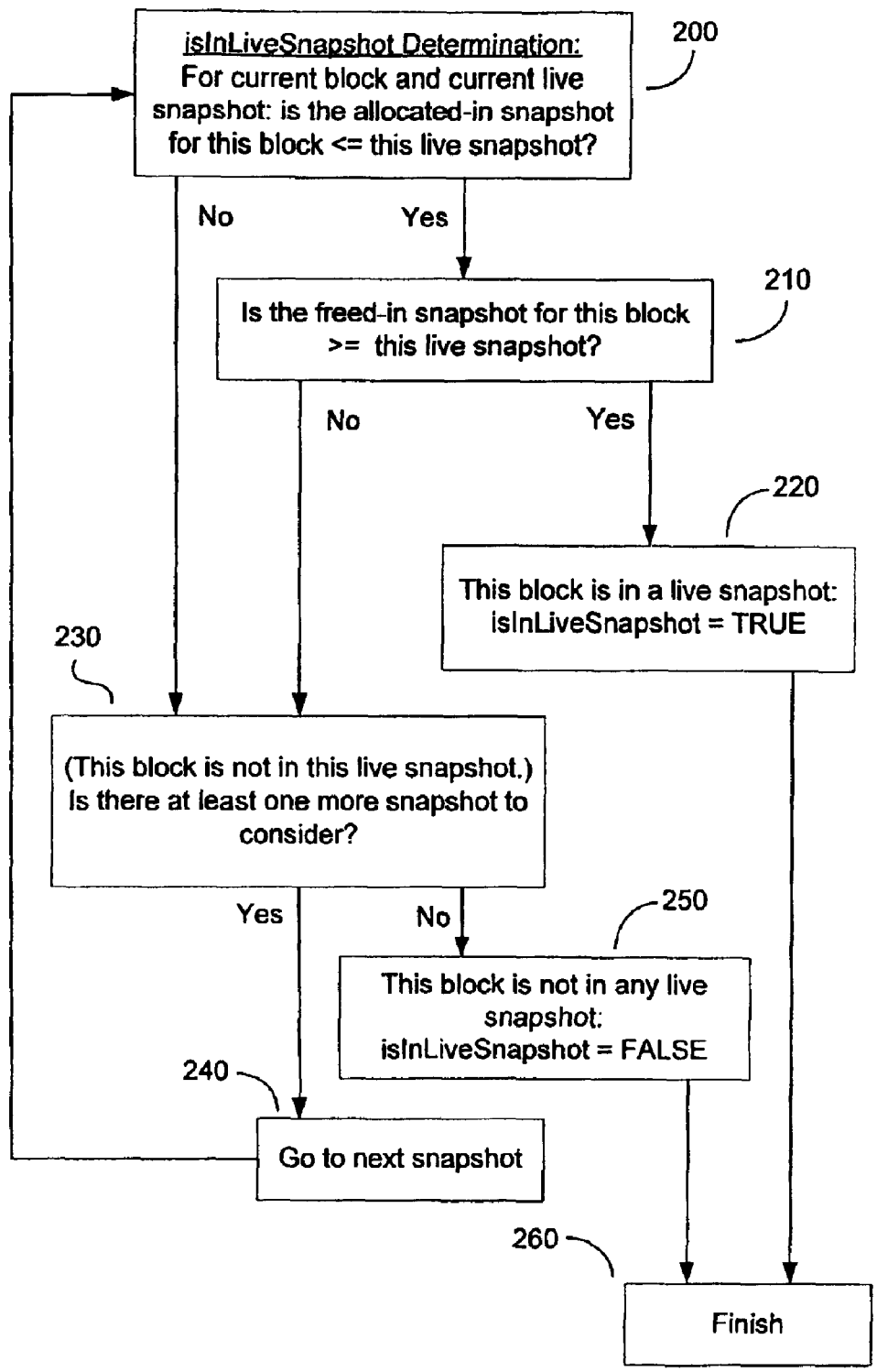
FIG. 4 is a flow chart illustrating a method of determining whether a data block is associated with a live snapshot.

FIG. 4 is a flow chart representing a procedure that can be executed to determine whether a block is available for writing. It is helpful to consider this flow chart in light of the following analogous pseudocode:

Procedure 1:

```
int NumberOfSnapshots;
int LiveSnapshots[numberOfSnapshots];
int NumberOfBlocks;
int AllocatedIn[numberOfBlocks];
int FreedIn[numberOfBlocks];
int LowestLiveSnapshot;
int CurrentSnapshot;
bool
isInLiveSnapshot (int allocatedIn, int freedIn)
{
    for (int s=0; s < NumberOfSnapshots; s++) {
        if ((allocatedIn <= LiveSnapshots[s]) &&
            (LiveSnapshots[s] <= freedIn)) {
                return(TRUE);
        }
    }
    return(FALSE);
}
```

The variables above may be defined as follows:

NumberOfSnapshots: the number of active (live) snapshots available.

LiveSnapshots[numberOfSnapshots]: an array with the size NumberOfSnapshots, with each entry in the array indicating the snapshot number of a live snapshot. This is represented in array 400 shown in FIG. 7.

NumberOfBlocks: a number representing the total number of blocks used by the system (e.g. n−1 in FIG. 2).

AllocatedIn[numberOfBlocks] and FreedIn [numberOfBlocks]: arrays of the snapshot numbers in which the blocks were allocated and freed, represented by the two columns of FIG. 2.

Figure 7:
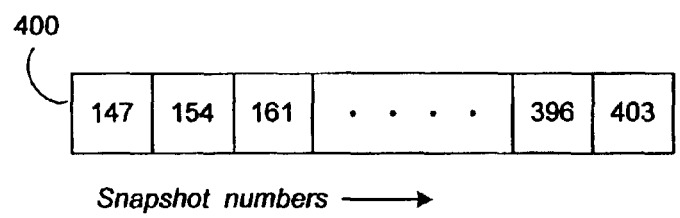
FIG. 7 is a diagram representing an array of live snapshot numbers.

LowestLiveSnapshot: the lowest snapshot in the LiveSnapshots array (e.g. snapshot number 147 in FIG. 7).

CurrentSnapshot: the snapshot number of the most recent snapshot (e.g. snapshot number 403 in FIG. 7).

Figure 5:
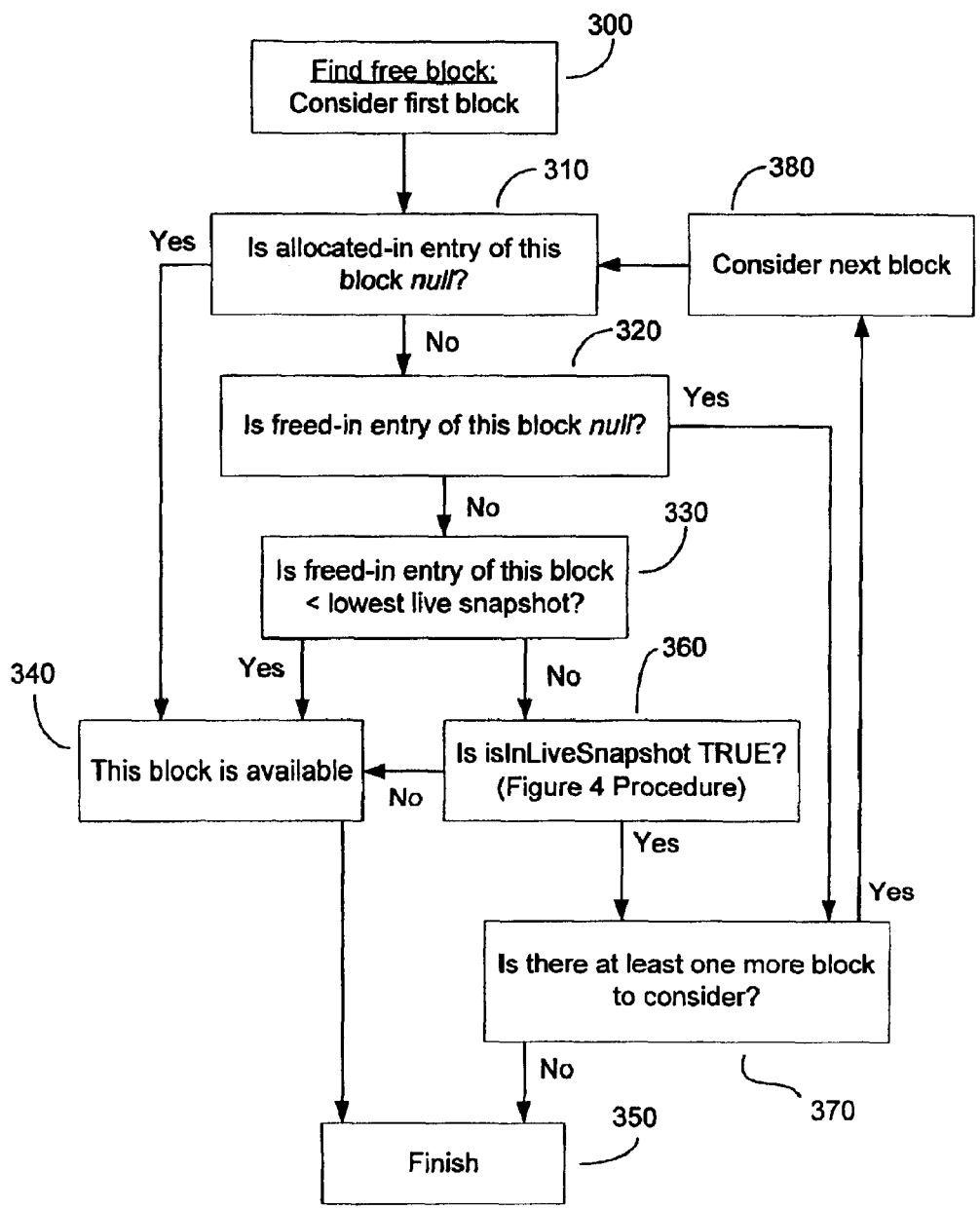
FIG. 5 is a flow chart illustrating a method according to the invention of finding a free block.

FIG. 5 is a flow chart showing a procedure that uses the method of Procedure 1, and which can be executed in real time, i.e. when it is needed to find a free block, and corresponds to the following pseudocode (in which the variables with the same names as those specified in Procedure 1 are identical):

Procedure 2:

```
int
findFreeBlock( )
{
    for (int b=0; b< NumberOfBlocks; b++) {
        if (AllocatedIn[b] == 0) {
            return (b);
        }
        if (FreedIn[b] == 0) {
            continue;
        }
        if ((FreedIn[b] < LowestLiveSnapshot) ||
            (!isInLiveSnapshot(AllocatedIn[b], FreedIn[b]))) {
                return(b);
        }
    }
    return (−1);
}
```

In FIG. 4 and Procedure 1, for a given block, the procedure determines whether any live snapshot (LiveSnapshots [s]) took place between the allocated-in time and the freed-in time for that block. This is done by iterating through the array 400 of FIG. 7, considering each snapshot in turn to determine whether the block under consideration "surrounds" any of the live snapshots. The array 400 is large enough to accommodate the total number of desired snapshots, which is referred to above as NumberOfSnapshots.

If there is no live snapshot between the allocated-in and freed-in times for a given block, then the block is available for writing. This corresponds to cases 1 and 3 in FIG. 6. If, however, there is a live snapshot with a time between the allocated-in and freed-in times for the block under consideration, that block is to be preserved in case the state of the system needs to be recovered from the live snapshot, and accordingly that block is unavailable. This corresponds to case 2 in FIG. 6, where snapshot "X" (at time 18) is a live snapshot, and a given block was allocated at time (or in snapshot) 14, but freed after snapshot X, i.e. at time 20.

As another example, if a free block is sought with reference to the allocation table array or table 35 as in FIG. 2, and the live snapshots at that time are represented as in the array 400 in FIG. 7, then it can be seen that blocks 0, 2 and 4 correspond to case 2 (and are therefore not free), while blocks 1 and 3 are free.

The procedure of FIG. 4 (see also Procedure 1) is carried out as follows. At step 200, it is determined whether the current block under consideration has an allocated-in time that is less than or equal to the time of a live snapshot, starting with a first live snapshot (LiveSnapshots[0]), and iterating through array 400 of FIG. 7. (Note that the pseudocode of Procedure 1 uses the index "s" to reference all of the live snapshots up to the total number of live snapshots NumberOfSnapshots.) If not, then this indicates that the current block is not in this live snapshot—i.e. it was allocated after this snapshot—and at step 230 it is determined whether there are any more live snapshots to consider. If so, then the next live snapshot is considered (step 240, and going back to step 200).

If there are no additional live snapshots (i.e. the index s in Procedure 1 has reached the value NumberOfSnapshots), then at step 250 a FALSE value is returned for isInLiveSnapshot, since the current block was not found to "surround" any of the live snapshots, and is thus available to overwrite.

If the determination in box 200 was positive, then the method proceeds to step 210, wherein it is determined whether the freed-in snapshot for the current block is greater than the snapshot number for this live snapshot. If that is the case, then the current block "surrounds" some live snapshot, as in case 2 of FIG. 6, and a TRUE value is returned. Otherwise, the method proceeds to step 230.

An optimization of this procedure could be achieved if the array 400 is maintained in such a way that the live snapshot numbers increase monotonically from one end to the other, e.g. from the lowest index to the highest. If this is the case, then in the procedure of FIG. 4 a negative determination instep 210 could lead directly to step 250. That is, since the allocated-in time was found to be less than or equal to the current live snapshot (step 200) and the freed-in time was also less than the current live snapshot (step 210), and if it is known that all remaining snapshots have times later than the current live snapshot, then it is not possible that the current block "surrounds" any of those subsequent snapshot times. Thus, maintaining array 400 (or at least accessing the snapshots) in a monotonically increasing fashion allows the procedure of FIG. 4 to bypass consideration of all those subsequent snapshots, which could lead to a considerable reduction in the number of cycles needed to determine whether a given block is available. Appropriate pseudocode for this modification is as follows:

Procedure 2.1:

```
bool
isInLiveSnapshot(int allocatedIn, int freedIn)
{
    for (int s = 0; s < NumberOfLiveSnapshots; s++) {
        if (allocatedIn <= LiveSnapshots[s]) {
            if (LiveSnapshots[s] <= freedIn) {
                return(TRUE);
#ifdef LiveSnapshotsStoredInMonotonicallyIncreasingOrder
            } else {
                return(FALSE);
#endif LiveSnapshotsStoredInMonotonicallyIncreasingOrder
            }
        }
    }
    return(FALSE);
}
```

In the second if test, Procedure 2.1 thus immediately returns a FALSE value if the value LiveSnapshots[s] is greater than FreedIn and if the live snapshots are stored in a monotonically increasing order. If the live snapshots are not stored in this way, then the procedure must iterate through all of the live snapshots to see if the current block overlaps with any of them.

Figure 6:
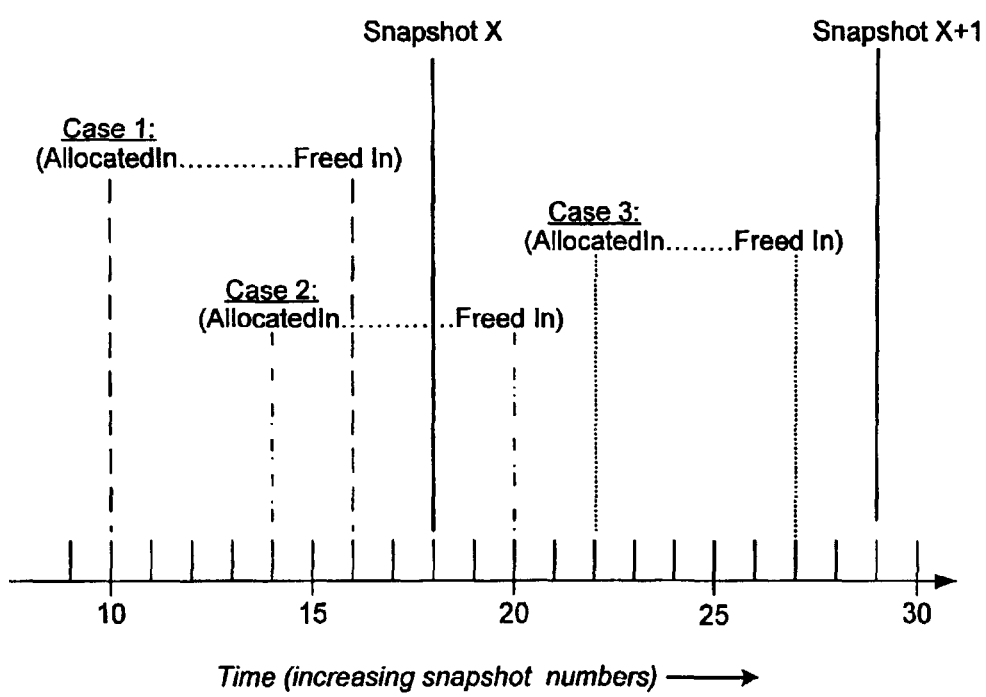
FIG. 6 is a diagram depicting several possible situations of blocks relative to snapshots.

Thus, the procedure of FIG. 4 returns a TRUE value for any block corresponding to case 2 of FIG. 6, but for blocks corresponding to cases 1 and 3 it returns a FALSE value, to indicate that the block in consideration does not "surround" a live snapshot. If a TRUE value is returned, the system will need to consider a different block to write to, which is handled by Procedure 2.

The method of FIG. 5 (Procedure 2) uses the method of FIG. 4 in a manner described below, and determines for the set of blocks whether each is available (e.g. as in cases 1 and 3 of FIG. 6) or unavailable (case 2 of FIG. 6). The method searches through the array 35 of FIG. 2 until a free block is located, or there are no more blocks to be considered.

For a given block, at step 310 it is determined whether the allocated-in entry in the allocation table (FIG. 2) is null. If it is, this means that the block has not been allocated, and thus that it is available (step 340), and therefore the procedure can end immediately (step 350), since an available block has been found. Block 6 in FIG. 2 would lead to this result.

If the determination in step 310 is negative, then at step 320 it is determined whether the freed-in block is null (i.e. the block has not been freed); and if so, the method proceeds to step 370 (where it is determined whether there are any more blocks to consider), and then to step 380 and back to step 310. This situation arises where a block has been allocated but not freed, as with block 5 in FIG. 2.

If the determination of steps 310 and 320 are both negative, this means that the current block has been both allocated and freed, as is the case with blocks 0–4 in FIG. 2. In this case, the method proceeds to step 330, where it is determined whether the freed-in time of the current block is lower than the lowest live snapshot—in which case the block is available, and the method proceeds to step 340. This would be the case with blocks 1 and 3 in FIG. 2 (using the live snapshot numbers of FIG. 7), which were freed in snapshots 42 and 141, respectively, while the lowest live snapshot in FIG. 7 is snapshot 147.

Note that being allocated or freed "in" a snapshot may be used to refer to a block that is allocated or freed during a time period that is covered by a given snapshot. For instance, if snapshots 1 and 2 are consecutive snapshots, a block is allocated "in" snapshot 2 if it was allocated after snapshot 1 was taken but before (or substantially at the time that) snapshot 2 was taken.

Steps 310–320 constitute a quick precheck of the availability of the current block, and correspond to the lines:

```
if (AllocatedIn[b] == 0) {
    return (b);
}
if (FreedIn[b] == 0) {
    continue;
``` from Procedure 2 above.

Step 330 corresponds to the line:

if (FreedIn[b]<LowestLiveSnapshot)||from Procedure 2.

Taken together, steps 310–330 can be implemented as a rapidly executed set of tests to quickly determine whether a block is available. If these tests do not result in a determination that the current block is available, then the method proceeds to step 360, where the isInLiveSnapshot method (Procedure 1 and FIG. 4) is carried out.

Thus, if any of steps 310–330 leads to a determination that the current block is available, then step 360 is avoided. If step 360 is executed, this calls the routine of FIG. 4 (Procedure 1), which will in general be a longer procedure, depending upon the number of live snapshots stored for the system. If Procedure 1 returns a TRUE value for isInLiveSnapshot, then the method of FIG. 5 proceeds to step 370, and if there are additional blocks to consider, to step 380 and back to step 310. If Procedure 1 returns a FALSE value for isInLiveSnapshot, then the block is available, and the method proceeds to steps 340 and 350.

It is possible in alternative embodiments to execute Procedure 1 and/or 2 (or the methods of FIGS. 4 and/or 5) in the background, or asynchronously, so that a real-time determination of whether a block is available for writing will be accomplished more quickly. In this case, whenever a block is found which is available for writing (e.g. it has been allocated and freed and does not surround a live snapshot), both the AllocatedIn and FreedIn fields for that block in the allocation table may be set to null, so that that quick test of Procedure 2 will determine more quickly that that block is available.

In another embodiment, either in combination with the foregoing variation or independent thereof, whenever a block has not been allocated—e.g. its AllocatedIn value is null—then its FreedIn value in the allocation table 35 could be set to the value of a pointer to the next succeeding free block. This can be adapted into Procedure 2 to speed up the location of free blocks.

Using the above procedures, it is not necessary to store a field or bit of data for each block of data, cross-referenced with each snapshot, to indicate whether that block was used in each given snapshot. Rather, it is only necessary to store the allocated-in and freed-in times or snapshots with respect to each block of data, and the methods of Procedures 1–2 (and/or FIGS. 4–5) can be used to locate available blocks.

The methods described above and any other operations that may be useful to implement the invention may be implemented as software, hardware and/or firmware (which may generally be referred to as "logic"), in general in any suitable configuration for a given application. For instance, the methods of FIGS. 4 and 5 or the corresponding pseudocode may be implemented as software or program modules stored on a computer-readable medium and loaded into memory for execution. The interface between logic designed to implement the invention and conventional data structures, file systems, directories and operating systems may include standard programming or circuit design features.

What is claimed is:

1. A microprocessor-based system having a microprocessor in communication with at least one memory and at least one storage device, including:
   a state information module configured to store sets of state information, each set corresponding to a time during which the system was operating;
   a data store module configured to store data blocks;
   an allocation table stored by the system having an entry for each of at least a subset of the data blocks, each entry including a first value relating to a time of allocation of the corresponding data block and a second value relating to a time of freeing the corresponding data block; and
   a free block determination module configured to determine, for a given block, whether it is available for writing, based upon a comparison of that block's times of allocation and freeing with time information relating to at least one state information set.

2. The system of claim 1, wherein the free block determination module is configured to make the free block determination by determining whether a time relating to a state information set comes between the given block's allocation time and time of freeing.

3. The system of claim 1, wherein the free block determination module is configured to identify the given block as available to write if none of at least a subset of the state information sets has a time between the given block's times of allocation and freeing.

4. The system of claim 1, wherein some of the sets of state information are maintained as current sets of state information.

5. The system of claim 1, wherein the free block determination module is configured to determine whether each of a set of blocks is available for writing, and to identify the first such identified block as available.

6. The system of claim 5, wherein the free block determination module is configured to cease operation when a block is found to be available for writing.

7. A method for determining whether a data block is available for writing in a microprocessor-based system, including the steps of:
   storing at least one set of state information at a first time relating to the system;
   maintaining an allocation table which includes an entry for each of at least a subset of data blocks in a data store module, each entry being configured to store a first value relating to a time of allocation of the corresponding data block and a second value relating to a time of freeing the corresponding data block; and
   for each of a plurality of data blocks,
      storing a time of allocation and a time of freeing the data block in an entry of the allocation table;
      determining, for a given data block, whether the given data block is available for writing by determining whether a period of time between its time of allocation and time of freeing correlates to the first time.

8. The method of claim 7, wherein, if the determining step is negative, identifying the given data block as available for writing.

9. The method of claim 7, wherein, if the determining step is positive, identifying the given data block as unavailable for writing.

10. The method of claim 7, including repeating the determining step until a block is determined to be available for writing.

11. The method of claim 7, wherein the determining step includes the step of determining whether the time of allocation for the given block is a null value indicating that the block has not been allocated, and if so then determining that the block is available for writing.

12. The method of claim 7, wherein the determining step includes the step of determining whether the time of freeing for the given block is a null value indicating that the block has not been freed, and if so then determining that the block is unavailable for writing.

13. The method of claim 7, wherein the determining step includes the step of determining whether the time of freeing the given block is earlier than any time relating to storing any of a plurality of sets of state information, and if so, then determining that the given block is available for writing.

14. A computer program product stored on a computer-usable medium, including a computer-readable program configured to cause a computer to perform a method to determine whether a data block is available for writing in a processor-based system for which a plurality of sets of state information are stored at different times, the method comprising:
   storing, for each of a plurality of data blocks, a time of allocation and a time of freeing the data block;
   maintaining an allocation table which includes an entry for each of at least a subset of said data blocks, each entry being configured to store a first value relating to a time of allocation of the corresponding data block and a second value relating to a time of freeing the corresponding data block; and
   determining, for a given data block, whether the given data block is available for writing by determining whether a period of time between its time of allocation and time of freeing correlates to a time of storing one of the plurality of sets of state information.

15. The computer program product of claim 14, wherein the determining further includes repeating the determination for each of a plurality of data blocks until a data block is found for which the period of time between its time of allocation and its time of freeing does not correspond to a time of storing one of the plurality of sets of state information.

16. A memory in communication with a microprocessor of a microprocessor-based system configured to store data blocks and a program module, the memory storing an allocation table including a first set of entries and a second set of entries, wherein:
   each entry of the first set of entries corresponds to an allocation time for a data block;
   each entry of the second set of entries corresponds to a deallocation time for a data block;
   wherein the program module is operable to compare an allocation time and a deallocation time for a given data block with a time of storing a set of state information for the microprocessor-based system to determine whether the given data block is available for writing.

17. The memory of claim 16, including a null value stored for at least some of the first entries, to indicate that the corresponding blocks have not been allocated.

18. The memory of claim 16, including a null value stored for at least some of the second entries, to indicate that the corresponding blocks have not been deallocated.

19. A method for determining whether each of a plurality of data blocks is available for writing in a microprocessor-based system, including the steps of:

storing a set of snapshots relating to state information of the system, the snapshots being stored at different snapshot times;

storing an allocation table which includes time information for each of at least a subset of the data blocks, said time information including a first value relating to a time of allocation of the corresponding data block and a second value relating to a time of freeing the corresponding data block; and determining, for at least a first subset of the data blocks, whether each data block in the subset is available for writing, by comparing each data block's time information with at least a subset of the snapshot times.

20. The method of claim 19, wherein the step of storing the allocation table includes storing a pointer to a next succeeding available block in place of the deallocation time for at least a second subset of data blocks that have both allocated and deallocated.

21. The method of claim 20, wherein the second subset includes data blocks whose allocation and deallocation times do not surround a snapshot time.

* * * * *